(12) United States Patent
Toshiyoshi et al.

(10) Patent No.: US 11,374,507 B2
(45) Date of Patent: Jun. 28, 2022

(54) VIBRATIONAL ENERGY HARVESTER DEVICE

(71) Applicants: The University of Tokyo, Tokyo (JP); National University Corporation Shizuoka University, Shizuoka (JP); Saginomiya Seisakusho, Inc., Tokyo (JP)

(72) Inventors: Hiroshi Toshiyoshi, Tokyo (JP); Gen Hashiguchi, Hamamatsu (JP); Hiroyuki Mitsuya, Sayama (JP); Hiroshi Imamoto, Tokyo (JP)

(73) Assignees: The University of Tokyo, Tokyo (JP); National University Corporation Shizuoka University, Shizuoka (JP); Saginomiya Seisakusho, Inc., Tokyo (JP)

( * ) Notice: Subject to any disclaimer, the term of this patent is extended or adjusted under 35 U.S.C. 154(b) by 600 days.

(21) Appl. No.: 16/464,367

(22) PCT Filed: Nov. 16, 2017

(86) PCT No.: PCT/JP2017/041174
§ 371 (c)(1),
(2) Date: May 28, 2019

(87) PCT Pub. No.: WO2018/101046
PCT Pub. Date: Jun. 7, 2018

(65) Prior Publication Data
US 2021/0119555 A1     Apr. 22, 2021

(30) Foreign Application Priority Data

Nov. 29, 2016 (JP) .............................. JP2016-231750

(51) Int. Cl.
*H02N 2/18* (2006.01)
*H02N 1/08* (2006.01)

(52) U.S. Cl.
CPC ............... *H02N 2/186* (2013.01); *H02N 1/08* (2013.01)

(58) Field of Classification Search
CPC ............ H02N 2/18; H02N 2/186; H02N 1/08; H02N 1/06; B81B 3/00; B81B 3/0018; B81B 3/0021
(Continued)

(56) References Cited

U.S. PATENT DOCUMENTS

2003/0053156 A1* 3/2003 Satoh ................. G02B 26/0841
358/509
2012/0306313 A1* 12/2012 Nakatsuka ............... H02N 1/08
310/300

(Continued)

FOREIGN PATENT DOCUMENTS

JP      2011-36089 A    2/2011
JP      2013-13256 A    1/2013
(Continued)

OTHER PUBLICATIONS

International Search Report (PCT/ISA/210) issued in PCT Application No. PCT/JP2017/041174 dated Jan. 23, 2018 with English translation (four (4) pages).
(Continued)

*Primary Examiner* — Ahmed Elnakib
(74) *Attorney, Agent, or Firm* — Crowell & Moring LLP

(57) ABSTRACT

The present invention enables frequency response in a wide band without lowering the Q value. This vibrational energy harvester device is provided with: a movable part capable of vibration in a vibration direction as a result of mechanical vibrational energy applied from the exterior, said movable
(Continued)

part being provided with a first surface along the vibration direction; and a fixed part provided with a second surface facing the first surface of the movable part with an interval therebetween, said fixed part being configured so as to be positionally fixed even against vibrational energy. A plurality of projections protruding in a direction orthogonal to the vibration direction are formed so as to be arranged like comb teeth in the vibration direction on each of the first surface of the movable part and the second surface of the fixed part. An electret film is formed on at least the first surface of the fixed part or on at least the second surface of the movable part. The vibrational energy harvester device is configured so that the spring rate of the movable part is modulated as a function of the position of the vibration direction by electrostatic force acting between the movable part and the fixed part.

6 Claims, 11 Drawing Sheets

(58) Field of Classification Search
USPC .......................................................... 310/300
See application file for complete search history.

(56) References Cited

U.S. PATENT DOCUMENTS

| 2013/0076202 A1 | 3/2013 | Naito et al. |
| 2013/0134830 A1 | 5/2013 | Ikuta et al. |
| 2018/0041140 A1 | 2/2018 | Fujita et al. |

FOREIGN PATENT DOCUMENTS

| WO | WO 2011/077717 A1 | 6/2011 |
| WO | WO 2011/086830 A1 | 7/2011 |
| WO | WO 2012/008113 A1 | 1/2012 |
| WO | WO 2016/129597 A1 | 8/2016 |

OTHER PUBLICATIONS

Japanese-language Written Opinion (PCT/ISA/237) issued in PCT Application No. PCT/JP2017/041174 dated Jan. 23, 2018 (five (5) pages).
Misawa K. et al., "Reliability of potassium ion electret in silicon oxide for vibrational energy harvester applications," Japanese Journal of Applied Physics, 2015, pp. 067201-1-067201-5, vol. 54, (five (5) pages).

\* cited by examiner

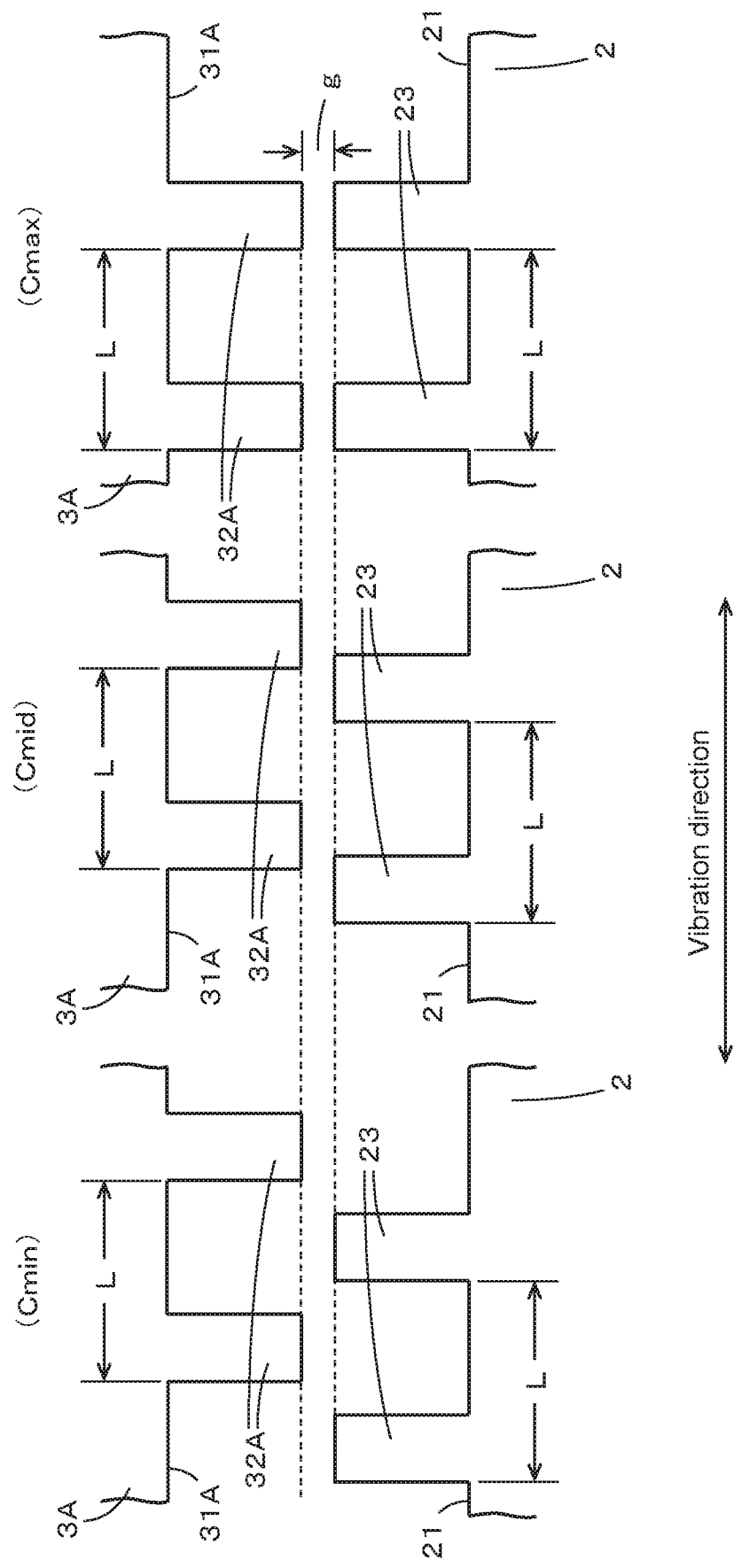

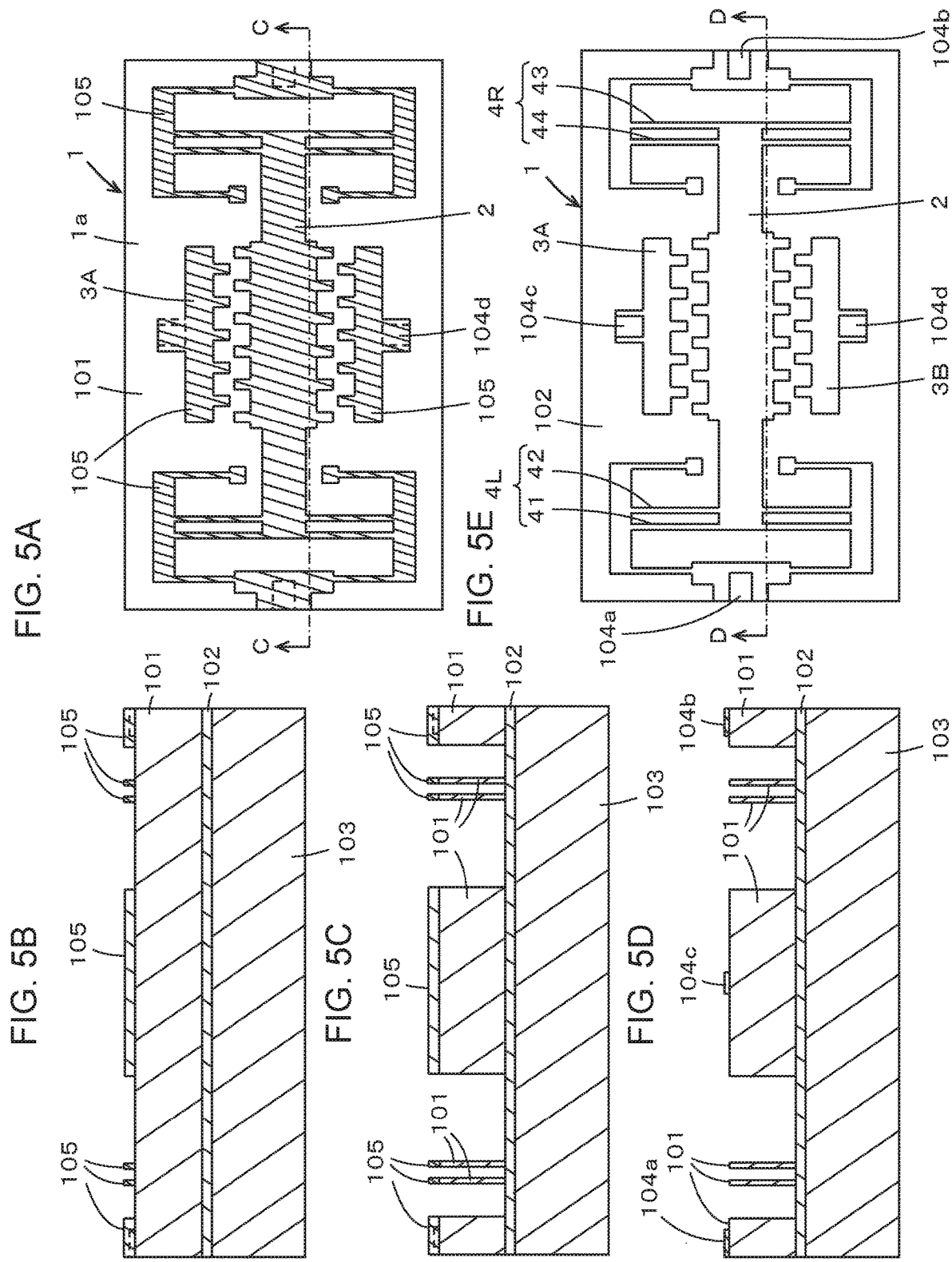

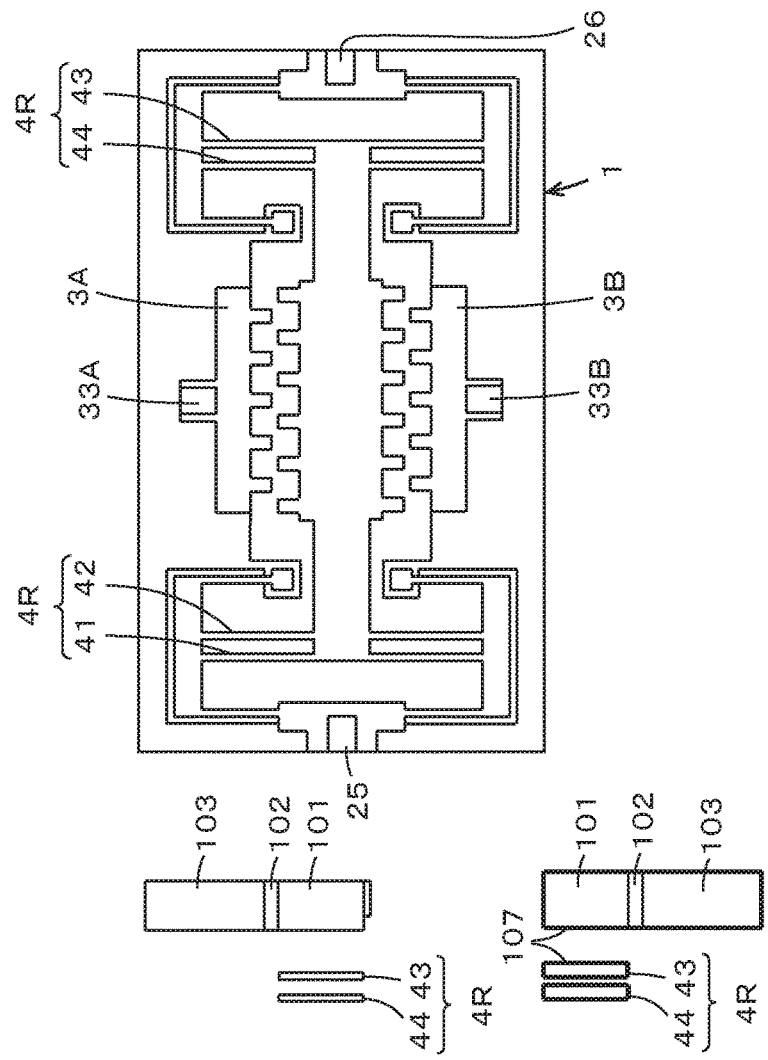
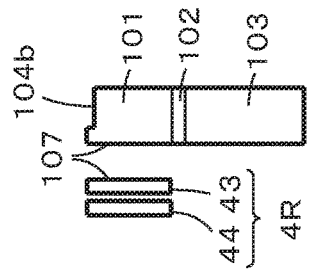
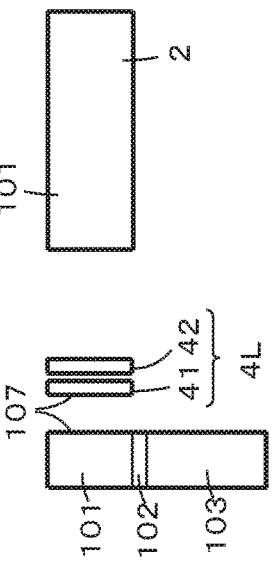
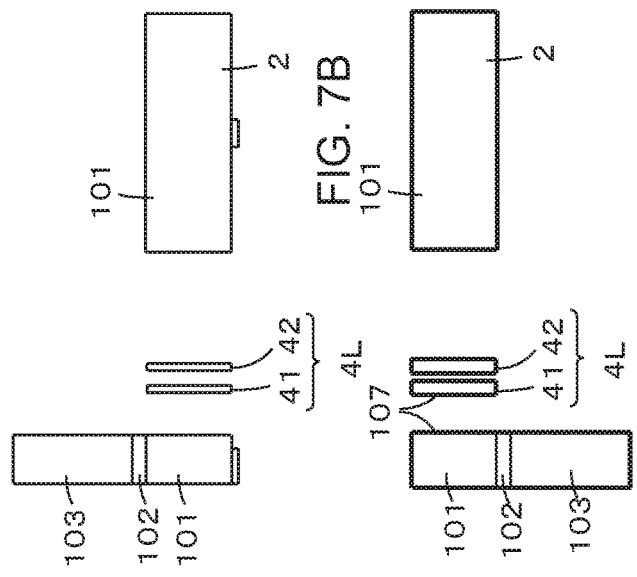
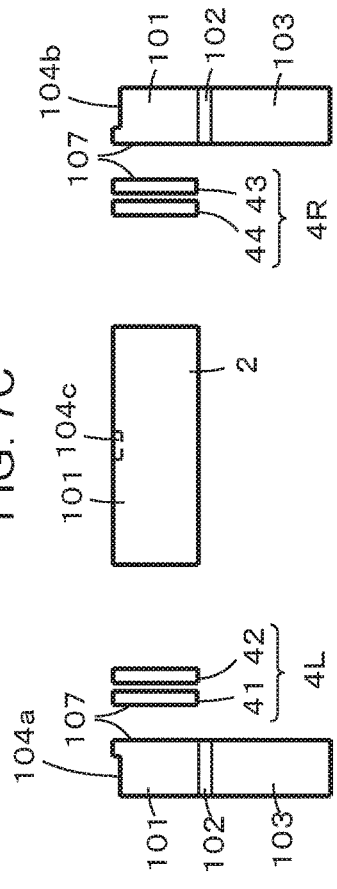

Model formula designed with electrostatic force acting between comb teeth $$F = m\frac{dv}{dt} + r_f v + \left[ k - \frac{2\pi^2 E^2 C_{def}}{dv} \cos\left(\frac{2\pi}{L}x\right) \right] x - \frac{2\pi E C_{def}}{dv} \sin\left(\frac{2\pi}{L}x\right) e$$

····(Formula 2)

$$P_{max} = \frac{mavQ}{4}$$ ····(Formula 3)

VIBRATIONAL ENERGY HARVESTER DEVICE

TECHNICAL FIELD OF THE INVENTION

Our invention relates to a vibrational energy harvester device of electrostatic type with an electret to convert mechanical vibrational energy into electricity by electrostatic induction action.

BACKGROUND ART OF THE INVENTION

Recent research and development are being conducted to put a vibrational energy harvester device to practical use of converting vibrational energy into electricity from environmental vibration such as walking vibration, vehicle travel vibration, bridge vibration, low-frequency vibration caused by wind power or the like.

Such a kind of vibrational energy harvester device of electrostatic type attracts rising attention for reasons that it is easily downsized relative to an electromagnet type and that it contains no harmful material such as PZT (Lead Zirconate Titanate Oxide, PbZrTi) contained in a piezoelectric type. Such a kind of vibrational energy harvester device of electrostatic type is disclosed in Patent document 1 (WO2011/086830) and Patent document 2 (JP2011-36089-A).

Patent document 1 discloses an electrostatic induction type power generator capable of displacing relatively as keeping an opposing condition that a first substrate is opposed to a second substrate through a predetermined gap. The first substrate is provided with a plurality of strip-shaped electrets disposed along a direction of the relative displacement while the second substrate is provided with a first electrode and a second electrode opposing to the second electret, so that the relative displacement changes a first capacitance between the electret and the first electrode as well as a second capacitance between the electret and the second electrode to output electricity.

Patent document 2 discloses a device of MEMS (Microelectromechanical Systems) provided with a first electrode having an electret film formed on a substrate and a second electrode which has a plurality of openings and is opposed to the first electrode through an air gap so that the capacitance between the electret film and the second electrode is changed to output electricity by vibrationally shifting the second electrode.

Both the vibrational energy harvester devices disclosed in Patent document 1 and Patent document 2 are configured to have a high Q factor (Quality factor) representing sharpness of the resonance at a predetermined frequency unique to the device. A conventional vibrational energy harvester device may have a high Q factor corresponding to the half-value width of 5 Hz at a resonant frequency. Thus the vibrational energy harvester devices disclosed in Patent document 1 and Patent document 2 are configured to efficiently convert vibration to electricity at a predetermined frequency corresponding to the high Q factor, and therefore the vibrational power generation can be performed with economy when external vibrational energy has an excitation vibration frequency corresponding to the predetermined frequency.

PRIOR ART DOCUMENTS

Patent Documents

Patent document 1: WO2011/086830
Patent document 2: JP2011-36089-A

SUMMARY OF THE INVENTION

Problems to be Solved by the Invention

The above-described environmental vibration generally has a wide distribution of frequency band instead of a single peak at a frequency. However, the vibrational energy harvester devices as disclosed in Patent document 1 and Patent document 2 might have a poor utilization efficiency of vibration frequency since only the resonant frequency can perform the frequency response so that only a few elements of vibration frequency limited within the environmental vibration can be utilized for power generation.

It is possible that full width at half maximum of the resonance peak is increased by reducing the Q factor of vibrational energy harvester device to perform the frequency response to vibrate in a wide frequency band. However, the reduction of Q factor of vibrational energy harvester device might decrease the resonant sensitivity to increase the loss to external vibrational energy. It is not preferable that the loss to external vibrational energy is increased by further decreasing the resonant sensitivity which is basically low for this kind of environmental vibration.

It could be helpful to provide a vibrational energy harvester device capable of resolving the above-described problems.

Means for Solving the Problems

To solve the above-described problems, our invention of claim 1 provides, a vibrational energy harvester device capable of vibrating in a vibration direction by an externally supplied vibrational energy, comprising: a movable part having a first surface along the vibration direction; and a fixed part which has a second surface opposed through a gap to the first surface and is positionally fixed to allow the movable part to vibrate in the vibration direction, wherein the first surface of the movable part and the second surface of the fixed part are provided with a plurality of projections which project in a direction orthogonal to the vibration direction and are disposed to form a shape like comb teeth in the vibration direction, an electret film having an electret electric potential is formed on at least one of the first surface of the movable part and the second surface of the fixed part, and the movable part has a spring rate which is modulated according to a function of a positional parameter in the vibration direction through an electrostatic force acting between the movable part and the fixed part.

Further, our invention of claim 2 provides, the vibrational energy harvester device according to claim 1, wherein the electret electric potential, an array pitch of the projections of the fixed part and the projections of the movable part, a difference between a maximum value and a minimum value of a capacitance between the fixed part and the movable part vibrationally shifting, are selected to reduce the spring rate of the movable part from an initial value of the spring rate corresponding to a free vibration of the movable part.

Furthermore, our invention of claim 3 provides, the vibrational energy harvester device according to claim 1 or 2, wherein the fixed part and the movable part are MEMS devices formed from a semiconductor substrate.

In the above-described vibrational energy harvester device according to claim 1, the electrostatic force acting between the projections of the movable part and the projections of the fixed part at the electret electric potential changes because the position of the movable part relative to the fixed part changes according to the vibration. When such an electrostatic force has a value affecting the spring rate (elastic coefficient) at the time of free vibration of the movable part with no electrostatic force, the movable part has a spring rate which is modulated according to a function of a positional parameter in the vibration direction through an electrostatic force acting between the movable part and the fixed part in claim 1 of our vibrational energy harvester device.

It is well-known that vibration frequency f can be calculated according to Formula 1 (f~k/m), wherein m is mass of movable part of vibrational device and k is spring rate of movable part.

Because the vibrational energy harvester devices disclosed in Patent documents 1 and 2 have an effect of electrostatic force ignorable with respect to the spring rate of free vibration of movable part, spring rate k of movable part is almost the same as the spring rate of free vibration of movable part while the resonant frequency of vibrational energy harvester device is a specific frequency determined by spring rate k corresponding to the spring rate of free vibration.

In our vibrational energy harvester device, the movable part has a spring rate which is modulated according to a function of a positional parameter in the vibration direction through an electrostatic force acting between the movable part and the fixed part. Namely, spring rate k in Formula 1 changes as depending on the position in the vibration direction, so that vibration frequency f of our vibrational energy harvester device changes within a wide frequency band according to the change of the spring rate.

In such a case, our vibrational energy harvester device doesn't decrease the Q factor so that the responding vibration frequency band can be wide without great loss to external vibrational energy.

In our vibrational energy harvester device according to claim 2, the electret electric potential, an array pitch of the projections of the fixed part and the projections of the movable part, a difference between a maximum value and a minimum value of a capacitance between the fixed part and the movable part vibrationally shifting, are selected to reduce (such a reducing effect may be called soft-spring effect) the spring rate of the movable part from an initial value of the spring rate corresponding to a free vibration of the movable part.

Namely, because the electret electric potential, an array pitch of the projections of the fixed part and the projections of the movable part, a difference between a maximum value and a minimum value of a capacitance between the fixed part and the movable part vibrationally shifting, are selected to reduce the spring rate of the movable part from an initial value of the spring rate corresponding to a free vibration of the movable part, our vibrational energy harvester device can effectively aim to a broadband and the movable part can easily vibrate.

In claim 3, our vibrational energy harvester device is a MEMS device. Accordingly, a beneficial device of microsize environmental energy harvester element can be provided.

Effect According to the Invention

Our vibrational energy harvester device, in which spring rate k of the movable part is modulated by electrostatic force to act between the movable part and the fixed part according to a function of position in the vibration direction, can change spring rate k in Formula 1 as depending on the position in the vibration direction, so that vibration frequency f of the movable part changes within a wide frequency band according to the change of the spring rate.

Further, our vibrational energy harvester device doesn't decrease the Q factor so that the vibration frequency band can be wide without great loss to external vibrational energy.

BRIEF EXPLANATION OF THE DRAWINGS

FIGS. 3A to 3C are explanation views showing a main part of the example of the first configuration of our vibrational energy harvester device.

FIGS. 5A to 5E are explanation views showing the process for manufacturing a semiconductor according to the first configuration of our vibrational energy harvester device.

FIGS. 7A to 7D are explanation views showing the process for manufacturing a semiconductor according to the first configuration of our vibrational energy harvester device.

EMBODIMENTS FOR CARRYING OUT THE INVENTION

Hereinafter, examples of our vibrational energy harvester device will be explained with reference to the figures.

First Configuration

An embodiment of the first configuration of our vibrational energy harvester device will be explained. The following first configuration of vibrational energy harvester device is an example of MEMS device manufactured by a semiconductor manufacturing process.

Figure 1:
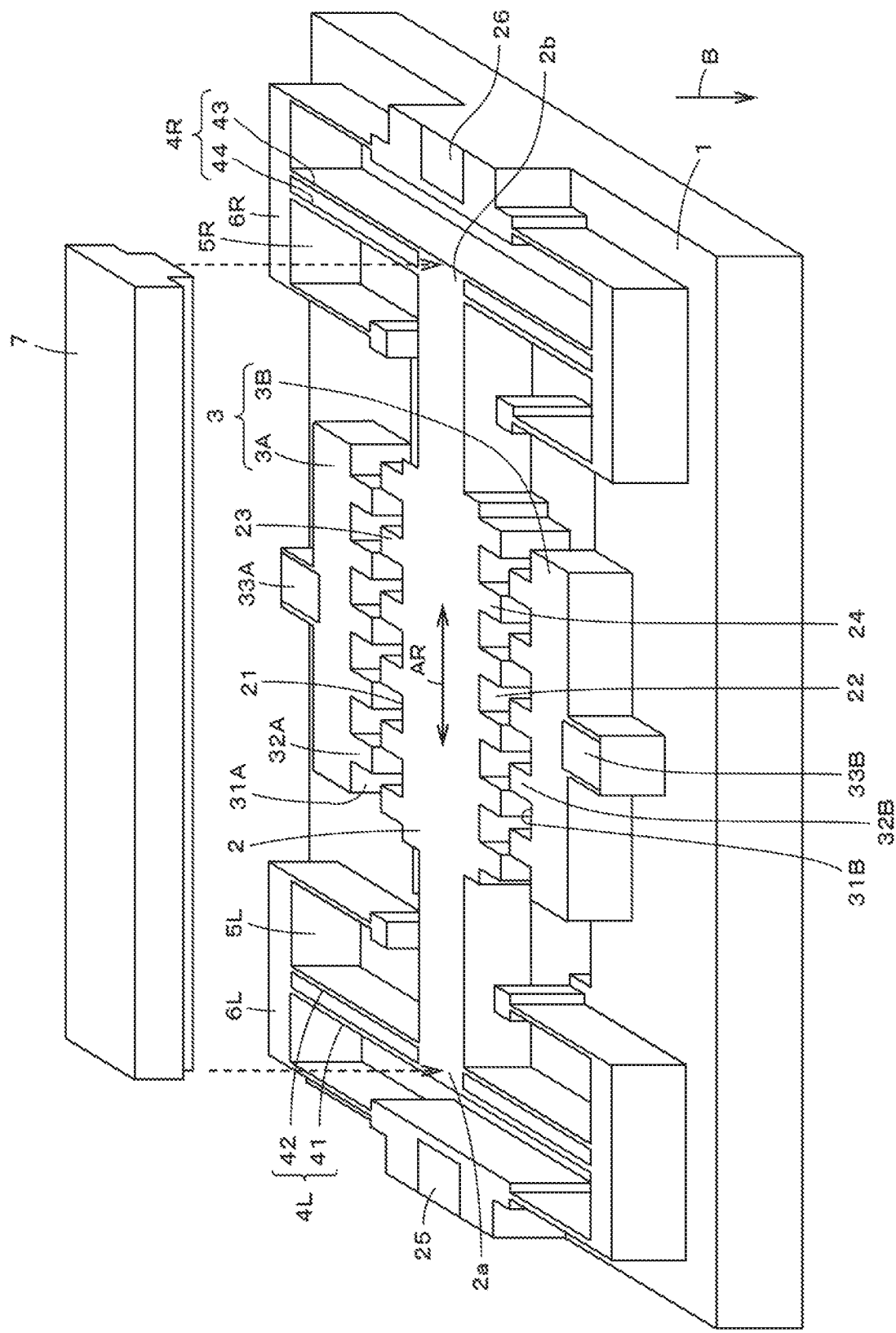
FIG. 1 is a perspective view for explaining an example of the first configuration of our vibrational energy harvester device.

FIG. 1 shows a perspective view for explaining an example of first configuration of vibrational energy harvester device 10. First configuration of vibrational energy harvester device 10 comprises semiconductor substrate 1, movable part 2 formed by a semiconductor manufacturing process described later, fixed parts 3A,3B, and support beams 4L,4R.

Movable part 2 having a cross section of long rectangle is configured to be able to vibrate in the vibration direction along the longitudinal direction of movable part 2 as shown with arrow AR in FIG. 1. Namely, both ends of movable part 2 in the longitudinal vibration direction are supported by support beams 4L,4R formed on semiconductor substrate 1 by a semiconductor manufacturing process so that movable part 2 can vibrate. In this example, movable part 2 vibrates along the surface of semiconductor substrate in a direction orthogonal to the direction indicated with arrow B in FIG. 1 which is orthogonal to the surface of semiconductor substrate 1.

Support beams 4L,4R comprise each two pieces of thin plates 41,42 and thin plates 43,44 provided as extending in a direction orthogonal to the vibration direction. Support beams 4L,4R are attached to support beam holding sections 6L,6R formed on semiconductor substrate 1 to surround spaces 5L,5R formed at both sides of movable part 2 in the vibration direction.

Both ends 2a,2b of movable part 2 in the longitudinal direction can shift in the vibration direction while the both ends are bound with support beams 4L,4R at the center between thin plates 41,42 and 43,44.

In this example, support beams 4L,4R comprise each two pieces of thin plates 41,42 and 43,44 so that movable part 2 tends to vibrate without deflection and stably in the direction along arrow AR without contacting fixed parts 3A,3B opposing, although support beams 4L,4R may comprise a piece of thin plate.

In this example, fixed parts 3A,3B are provided at a position that sandwiches movable part 2 in a direction orthogonal to the vibration direction of movable part 2. Fixed parts 3A,3B have each of surfaces 31A,31B along the vibration direction of movable part 2 parallel to a direction indicated with arrow B in FIG. 1 orthogonal to the surface of substrate. Surface 31A of fixed part 3A is opposed to surface 21 along the vibration direction of movable part 2 parallel to a direction orthogonal to the surface of substrate through a gap. Surface 31B of fixed part 3B is opposed to surface 22 along the vibration direction of movable part 2 parallel to a direction orthogonal to the surface of substrate through a gap. For the purpose of explanation, surfaces 21,22,31A,31B may be indicated as opposing surfaces 21,22,31A,31B.

Opposing surfaces 21,22 of movable part 2 are provided with a plurality of projections 23,24 which project in a direction orthogonal to the vibration direction and are disposed to form a shape like comb teeth in the vibration direction. As well, opposing surface 31A of fixed part 3A and opposing surface 31B of fixed part 3B are provided with a plurality of projections 32A,32B which project in a direction orthogonal to the vibration direction and are disposed to form a shape like comb teeth in the vibration direction. In this example, projections 23,24,32A,32B are similarly formed into a ridge having a rectangular cross section extending in the direction indicated with arrow B.

Figure 2:
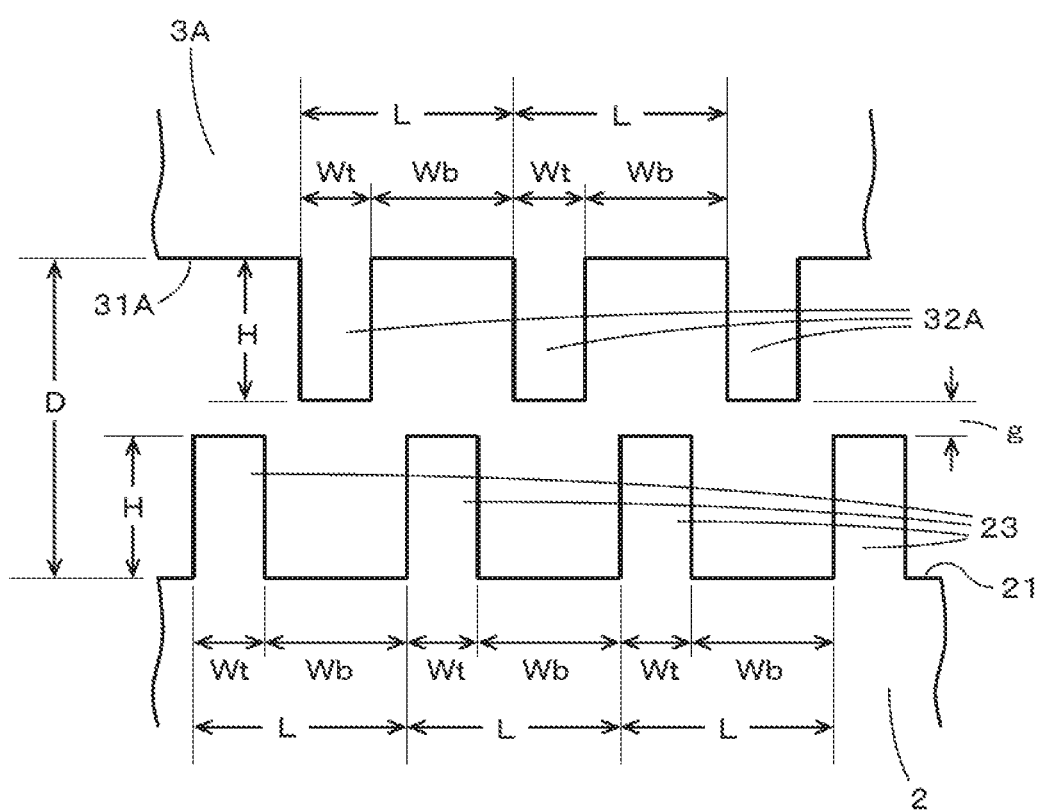
FIG. 2 is an explanation view showing a main part of the example of the first configuration of our vibrational energy harvester device.
Figure 4A:
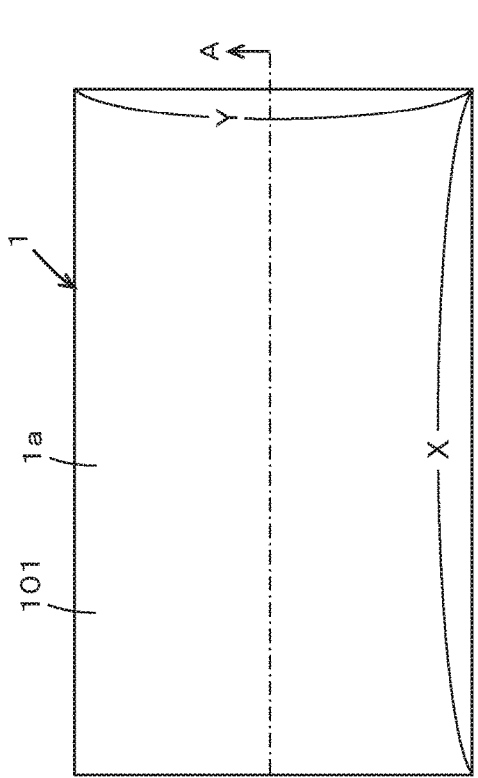
FIGS. 4A to 4E are explanation views showing a process for manufacturing a semiconductor according to the first configuration of our vibrational energy harvester device.
Figure 4E:
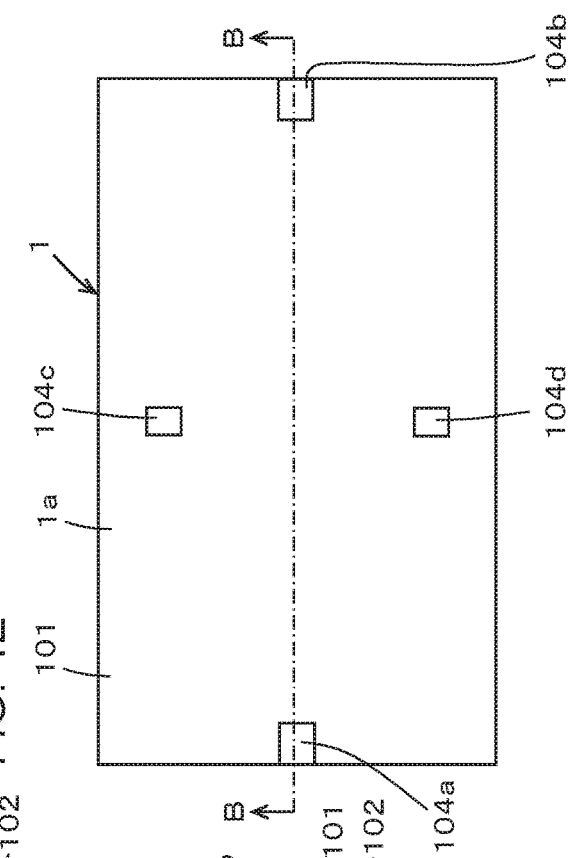
Figure 4B:
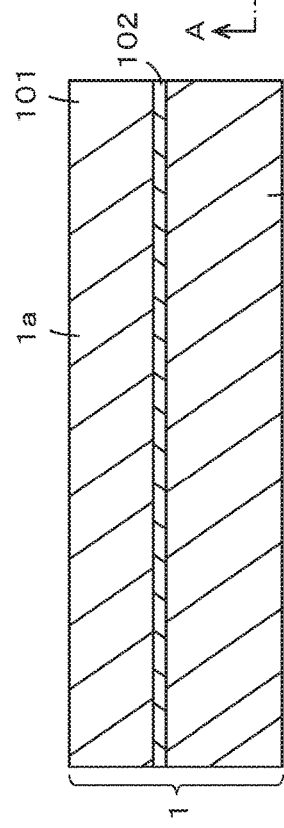
Figure 4C:
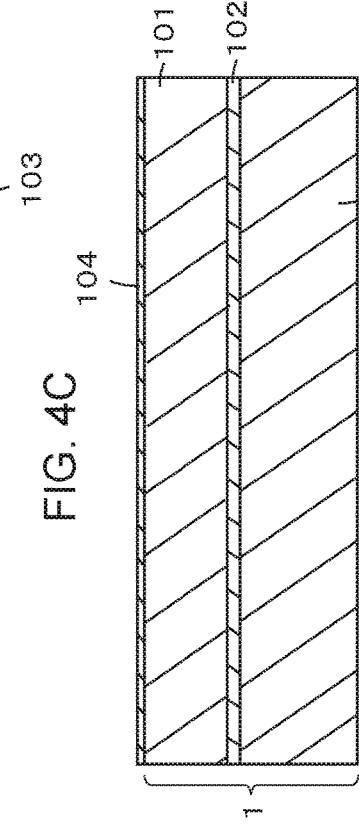
Figure 4D:
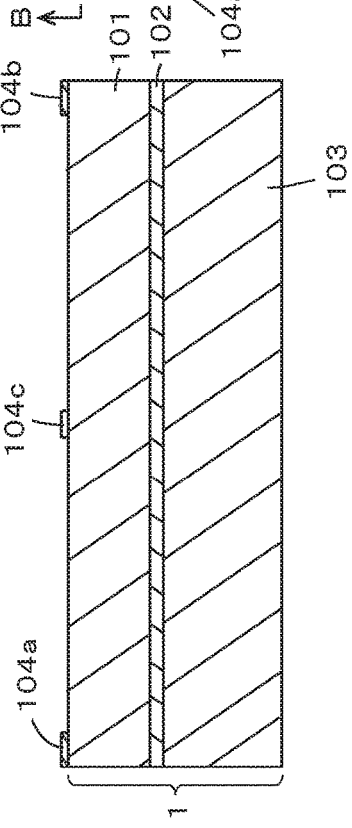
Figure 6A:
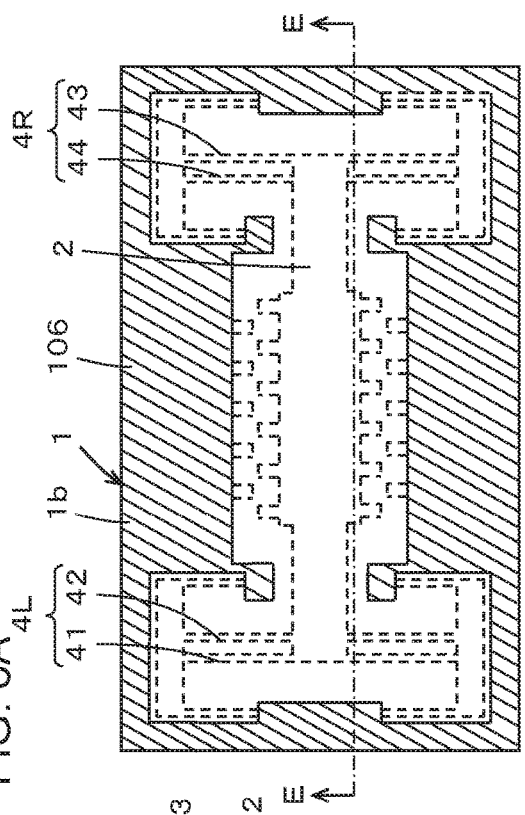
FIGS. 6A to 6E are explanation views showing the process for manufacturing a semiconductor according to the first configuration of our vibrational energy harvester device.
Figure 6E:
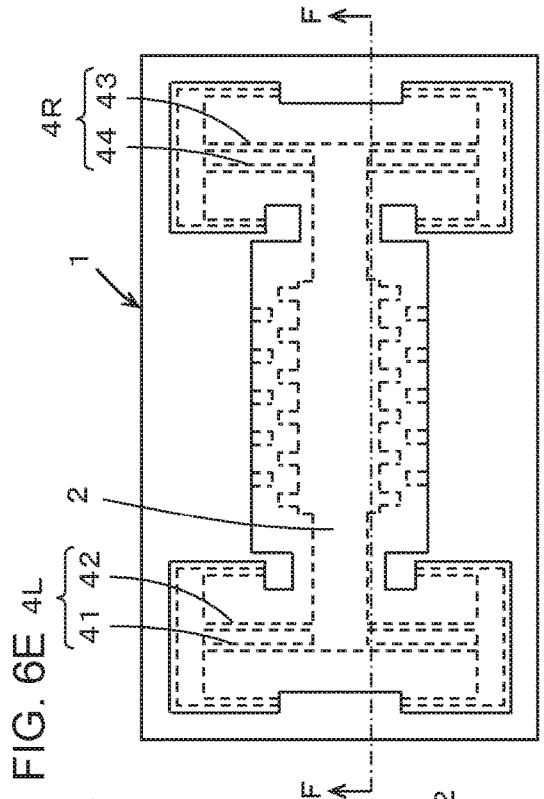
Figure 6B:
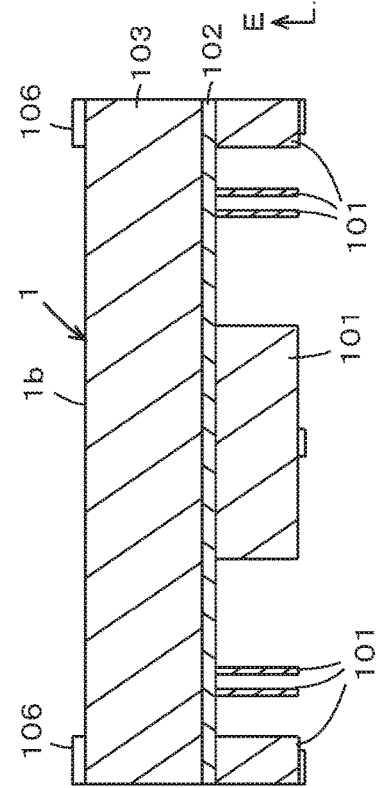
Figure 6C:
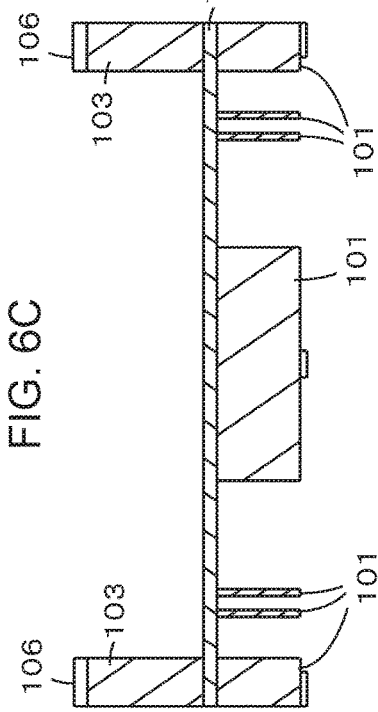
Figure 6D:
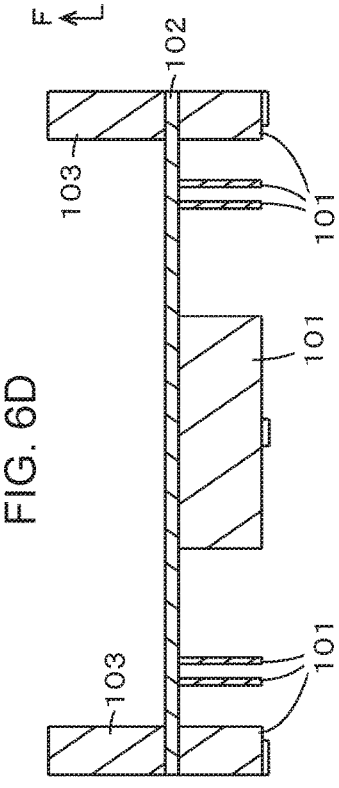

FIG. 2 is a plan view showing an opposing part between fixed part 3A and movable part 2, viewed from the above in a direction orthogonal to the vibration direction of movable part 2 along the direction indicated with arrow B in FIG. 1. In FIG. 2, a plurality of projections 23 formed on opposing surface 21 of movable part 2 have the same size with the same array pitch in the vibration direction as those of a plurality of projections 32A formed on opposing surface 31A of fixed part 3A.

In FIG. 2, projection 23 of movable part 2 has the same width Wt along the vibration direction and the same height H along a direction orthogonal to the vibration direction as those of projection 32A of fixed part 3A. Projection 23 of movable part 2 and projection 32A of fixed part 3A have length L of array pitch in the vibration direction. Therefore, there is gap Wb=L−Wt between projections 23 and 32A adjacent to each other.

Further, there is gap g between an end face of projection 23 of movable part 2 in a direction orthogonal to the vibration direction and another end face of projection 32A of fixed part 3A in a direction orthogonal to the vibration direction. Besides, there is a gap of distance D between opposing surface 21 at the base position of projection 23 of movable part 2 and opposing surface 31A at the base position of projection 32A of fixed part 3A.

Parameters in this example are as follows: Wt=20 μm; Wb=40 μm; L=60 μm; H=42.5 μm; g=5 μm; and D=90 μm. The vibrational energy harvester device may have 12 mm of length along the vibration direction of movable part 2 and 8 mm of length along a direction orthogonal to the vibration direction.

In FIGS. 1 and 2, vibrational energy harvester device 10 is provided with several pieces of projections 23,24 of movable part 2 as well as several pieces of projections 32A,32B of fixed parts 3A,3B for the purpose of simple illustration, although it should be provided with more pieces thereof actually.

Although FIG. 2 illustrates the relation between projection 32A and projection 23 only, the relation between a plurality of projections 32B formed on opposing surfaces 31B of fixed part 3B and a plurality of projections 24 formed on opposing surfaces 22 of movable part 2 is configured in the same manner. In this example, the positional relation (opposing phase relation) between projections 24 formed on opposing surfaces 22 of movable part 2 and projections 32B formed on opposing surfaces 31B of fixed part 3B is the same as the positional relation (opposing phase relation) between projections 23 formed on opposing surfaces 21 of movable part 2 and projections 32A formed on opposing surfaces 31A of fixed part 3A shown in FIG. 2. Namely, the opposing phase between projection 23 of movable part 2 and projection 32A of fixed part 3A is the same as the opposing phase between projection 24 of movable part 2 and projection 32B of fixed part 3B.

As described above, because there is gap g even when the tip of projections 23,24 of movable part 2 is opposed to the tip of projections 32A,32B of fixed parts 3A,3B, movable part 2 can vibrationally shift in the vibration direction indicated with arrow AR in FIG. 1 as keeping gap g with respect to fixed parts 3A,3B.

In this example, any one of fixed parts 3A,3B and movable part 2 is provided with an electret film and has an electret electric potential E. In this example, fixed parts 3A,3B may be provided with electret films and have electret electric potential E of −400 volts. Besides, fixed parts 3A,3B are electrically insulated from movable part 2 by the insulating layer of semiconductor substrate.

As shown in FIG. 1, movable part 2 is provided with electrodes 25,26 at both ends in the vibration direction while fixed parts 3A,3B are provided with electrodes 33A,33B at the ends of movable part 2 in a direction orthogonal to the vibration direction. These electrodes 25,26,33A,33B can be used as connection terminal electrodes for connecting vibrational energy harvester device 10 to a charging circuit.

With such a configuration, capacitance between fixed parts 3A,3B and movable part 2 can be changed according to the vibration of movable part 2. FIG. 3 (A), (B) and (C) show the opposing phase relation between projection 23 of opposing surface 21 of movable part 2 vibrating and projection 32A of opposing surface 31A of fixed part 3A, as well as the relation to the capacitance. The same explanation can be applied to the opposing phase relation between projection 24 of opposing surface 22 of movable part 2 vibrating and projection 32B of opposing surface 31B of fixed part 3B, as well as the relation to the capacitance.

Namely, FIG. 3 (A) shows projection 23 of movable part 2 positioned in the center between adjacent projections 32A of fixed part 3A while tip end faces of projections 23,32A are not opposed to each other in a direction orthogonal to the vibration direction. As shown in FIG. 3 (A), the tip end face of projection 23 of movable part 2 is opposed through distance D to opposing surface 31A of fixed part 3A while the capacitance between movable part 2 and fixed part 3A is Cmin at the minimum level.

In FIG. 3 (C), tip end face of projection 23 of movable part 2 is entirely opposed to tip end face of projection 32A of fixed part 3A in a direction orthogonal to the vibration direction. As shown in FIG. 3 (C), the tip end face of projection 23 of movable part 2 is opposed through narrow gap g to the tip end face of opposing surface 31A of fixed part 3A while the capacitance between movable part 2 and fixed part 3A is Cmax at the maximum level.

In FIG. 3 (B), tip end face of projection 23 of movable part 2 is partially opposed to tip end face of projection 32A of fixed part 3A in a direction orthogonal to the vibration direction. FIG. 3 (B) shows an intermediate condition between FIG. 3 (A) and FIG. 3 (C), while the capacitance between movable part 2 and fixed part 3A is Cmid at an intermediate level between Cmin at the minimum level and Cmax at the maximum level.

In this example, differential capacitance Cdef between Cmax at the maximum level and Cmin at the minimum level is large because gap g through which the tip end face of projection 23 of movable part 2 is opposed to the tip end face of projection 32A of fixed part 3A is much narrower than distance D through which opposing surface 21 of movable part 2 is opposed to opposing surface 31A of fixed part 3A. Width Wt of each of projection 23 of movable part 2 and projection 32A of fixed part 3A and height H are selected so that differential capacitance Cdef is at the maximum. Namely, height H corresponding to maximum differential capacitance Cdef depends on width Wt selected. It is not possible that differential capacitance Cdef becomes greater than the maximum level by changing height H.

Figures 11, 12:
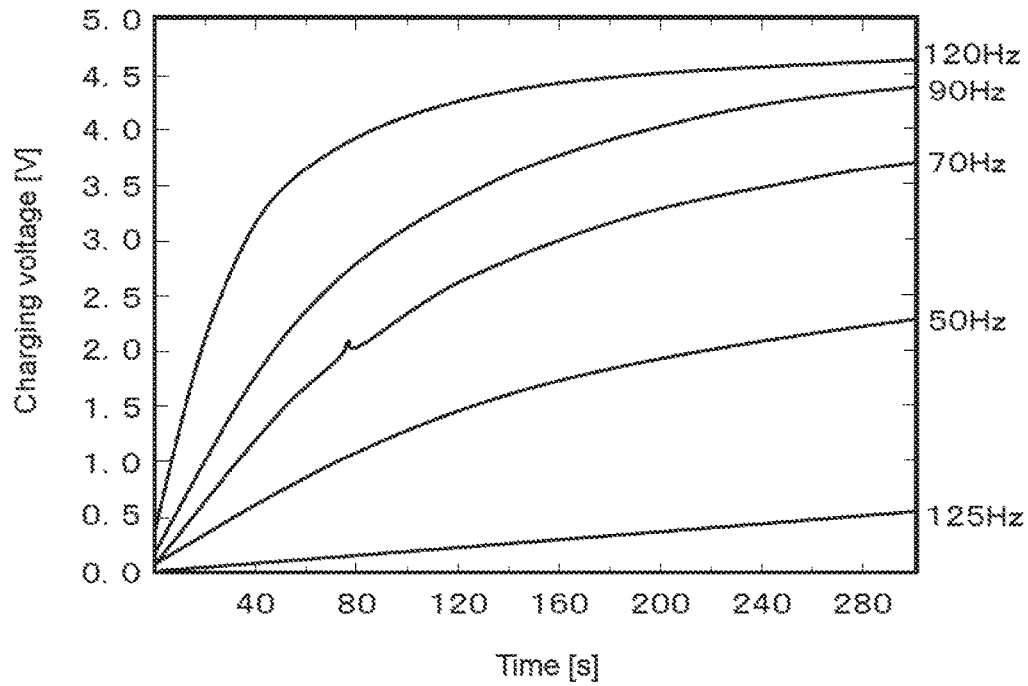
FIG. 11 is a characteristic diagram showing a frequency characteristic of the second configuration of our vibrational energy harvester device.
FIG. 12 shows formulae showing a model of our vibrational energy harvester device.

FIG. 12 shows Formula 2 as a model of vibrational energy harvester device configured as described above, which is designed with electrostatic force acting between movable part 2 and fixed parts 3A,3B and represents force F applied to movable part 2.

In the model Formula 2, symbol v indicates vibration speed of movable part 2, symbol k indicates spring rate (elastic coefficient) of movable part 2 supported by support beams 4L,4R vibrating free from electrostatic force, and symbol x indicates position of movable part 2 in the vibration direction within a cycle of array pitch L along the vibration direction of projections 23,24,32A,32B.

The third term of Formula 2 corresponds to a spring rate of movable part 2 supported by support beams 4L,4R when designed with electrostatic force acting between movable part 2 and fixed parts 3A,3B, and specifically corresponds to the difference between a component related to the electrostatic force and spring rate k of movable part 2 supported by support beams 4L,4R vibrating free from electrostatic force. The component related to the electrostatic force in the third term of Formula 2 is a function of position x.

The third term of Formula 2 shows that movable part 2 supported by support beams 4L,4R has a spring rate which is modulated as a function of position x according to the electrostatic force acting between movable part 2 and fixed parts 3A,3B, in the first configuration of vibrational energy harvester device 10.

As described with Formula 1 above, the vibrational energy harvester device has a vibration frequency in proportion to spring rate k. In this example of vibrational energy harvester device 10, movable part 2 supported by support beams 4L,4R has a spring rate which is modulated as a function of position x according to the electrostatic force acting between movable part 2 and fixed parts 3A,3B so that the spring rate is not constant but changes according to position x. Therefore, resonant frequency f of the first configuration of vibrational energy harvester device 10 represented by Formula 1 is not predetermined like a case of constant k but changes within a wide frequency band according to position x.

When cos (2n/L)x is positive in the third term of Formula 2, the spring rate of movable part 2 supported by support beams 4L,4R is less than spring rate k for movable part 2 vibrating freely from electrostatic force because of the component related to the electrostatic force acting between movable part 2 and fixed parts 3A,3B. Namely, movable part 2 becomes easy to vibrate. This is a phenomenon called soft-spring effect as disclosed in a prior art document (JOURNAL OF MICROELECTROMECHANICAL SYSTEM, VOL. 20, NO. 6, DECEMBER 2011). According to the prior art document, the soft-spring effect contributes to widening the frequency band of vibrational energy harvester device.

To effectively achieve the soft-spring effect, it is preferable that the value to subtract from spring rate k is set to a value unable to disregard with respect to spring rate k in the third term of Formula 2. In the first configuration of vibrational energy harvester device 10, values of: electret electric potential E of electret film; array pitch L of projection 23 of movable part 2 and projection 32A of fixed part 3A in the vibration direction; and differential capacitance Cdef between Cmin at the minimum level and Cmax at the maximum level of capacitance between movable part 2 and fixed parts 3A,3B, are selected to subtract an unignorable value from spring rate k in the third term of Formula 2. Differential capacitance Cdef between Cmin at the minimum level and Cmax at the maximum level of capacitance between movable part 2 and fixed parts 3A,3B is basically determined according to gap g, width Wt and distance D while the smaller the gap g is the greater the value is.

Said "value unable to disregard with respect to spring rate k in the third term of Formula 2" means a value having an order different by 1 or less digit from spring rate k, as excluding values having an order different by 2 or more digits from spring rate k.

The values such as electret electric potential E of electret film, array pitch L, gap g and distance D are selected so that the value to subtract from spring rate k is set to a value unable to disregard with respect to spring rate k in the third term of Formula 2 to achieve a good soft-spring effect. In the first configuration of vibrational energy harvester device, $2\pi^2 E^2 Cdef/L^2$ as coefficient of cosine is 830 N/m in the third term of Formula 2 of vibrational energy harvester device 10 when spring rate k is 790 N/m.

Accordingly, vibrational energy harvester device 10 in this example can perform vibrational power generation efficiently by the soft-spring effect as responding to weak environmental energy present in a wide range within a range of micro vibration range in which the cosine is positive in the third term of Formula 2.

In this example, vibrational energy harvester device 10 is configured to not only vibrate within the range of micro vibration in which the cosine is positive in the third term of Formula 2 but also vibrate with greater amplitude when external vibrational energy is greater, obtaining power generation output according to the change of capacitance between movable part 2 and the fixed part in the same manner as an ordinary capacitance type of vibrational energy harvester device.

In FIG. 1, symbol 7 indicates a weight which is not made from semiconductor substrate 1 but is separately prepared and attached onto movable part 2 of the first configuration of vibrational energy harvester device 10. When weight 7 is placed on movable part, mass m of movable part 2 increases to increase output P (see Formula 3 described later) of vibrational energy harvester device 10.

As described above, vibrational energy harvester device 10 in this example is provided with projections 23,24,32A, 32B which are disposed on opposing surfaces 21,22 of movable part 2 and opposing surfaces 31A,31B of fixed part 3 and have a shape like comb teeth along the vibration direction, so that the spring rate of movable part 2 is modulated as a function of position x in the vibration direction as shown in the model formula of Formula 2 to achieve a vibrational energy harvester device having a wide vibration frequency band.

In the first configuration of vibrational energy harvester device 10, values of: electret electric potential E of electret film; array pitch L of projection 23 of movable part 2 and projection 32A of fixed part 3A in the vibration direction; and differential capacitance Cdef between Cmin at the minimum level and Cmax at the maximum level of capacitance between movable part 2 and fixed parts 3A,3B, are selected to subtract an unignorable value from spring rate k in the third term of Formula 2. Therefore the soft-spring effect can act effectively to practically realize a wide frequency band of vibrational energy harvester device 10.

The above-described prior art document discloses a vibrational energy harvester device aiming to a broadband. However, the vibrational energy harvester device in the prior art document is provided with projections like comb teeth which engage to each other while the movable part vibrates in the height direction of the engaging projections. Namely, the movable part vibrates as approaching the fixed part or going away. Therefore, the vibrational energy harvester device in the prior art document might not be able to continue to vibrate because of pull-in phenomenon caused by electrostatic force. It is because the pull-in phenomenon might stop vibration when the movable part approaches the fixed part by ⅓ or more of length of gap between two opposing surfaces under a condition in which electrostatic force acts between two surfaces opposing to each other through a gap.

On the other hand, vibrational energy harvester device 10 in this example has movable part 2 to vibrationally shift along the opposing surfaces 21,22,31A,31B while gap g is provided between projections 23,24 in the array like comb teeth formed on opposing surfaces 21,22 and projections 32A,32B in the array like comb teeth formed on opposing surfaces 31A,31B of fixed parts 3A,3B. Therefore, the pull-in phenomenon does not occur in vibrational energy harvester device 10 in this example because movable part 2 vibrationally shifts in a direction orthogonal to gap g while keeping gap g at the minimum between fixed parts 3A,3B. Therefore, vibrational energy harvester device 10 in this example has an advantage that the amplitude of vibration of movable part 2 is not limited in principle.

Manufacturing Method of the First Configuration of Vibrational Energy Harvester Device As described above, the first configuration of vibrational energy harvester device 10 is a MEMS device formed by performing a semiconductor process to semiconductor substrate 1. The semiconductor substrate may be made of single-crystal silicon substrate, polycrystalline silicon substrate, SOI (Silicon on Insulator) substrate, ceramic substrate, metal substrate, glass substrate, polymer substrate or the like. Specifically, SOI substrate is selected as a semiconductor substrate for explaining this example of semiconductor manufacturing process about vibrational energy harvester device 10.

FIGS. 4 to 7 show an example of semiconductor manufacturing process about vibrational energy harvester device 10.

Prior to performing the semiconductor process, semiconductor substrate 1 made of SOI substrate is prepared. Vibrational energy harvester device 10 is separated by etching from semiconductor substrate 1 finally. For the purpose of convenience, the process will be explained for one vibrational energy harvester device 10. FIG. 4 (A) shows semiconductor substrate 1 of one vibrational energy harvester device 10, in which vertical length X is 12 mm and horizontal length Y is 8 mm, for example. FIG. 4 (B) shows a cross section of semiconductor substrate 1 cut in a direction orthogonal to substrate surface 1a. FIG. 4 (B) shows an A-A line cross section of FIG. 4 (A).

As shown in FIG. 4 (B), semiconductor substrate 1 provided with a plurality of layers in a direction orthogonal to substrate surface 1a comprises SOI layer 101 forming substrate side 1a, embedded oxide film layer 102 and handle layer 103. In this example, SOI layer 101 is made of P type silicon layer having thickness of 300 μm and specific resistance of 0.1 Ωcm. Embedded oxide film layer 102 is an insulative layer having thickness of 2 μm. Handle layer 103 is made of P type silicon layer having thickness of 500 μm and specific resistance of 0.1 Ωcm.

As shown in FIG. 4 (C) which shows a cross section at the same position as FIG. 4 (B), silicon nitride ($Si_3N_4$) film 104 is formed on the surface (substrate surface 1a) of SOI layer 101 by LPCVD (Low Pressure Chemical Vapor Deposition) method. On silicon nitride film 104, electrodes 25,26,33A, 33B shown in FIG. 1 are supposed to be formed later.

Silicon nitride film 104 is subject to a patterning process to leave sites 104a,104b,104c,104d for forming electrodes 25,26,33A,33B by removing the other parts. FIG. 4 (E) shows semiconductor substrate 1 viewed from substrate surface 1a similarly to FIG. 4 (A) while FIG. 4 (D) shows a B-B line cross section of FIG. 4 (E).

As shown in FIG. 5 (A) with hatching, the patterning process is performed to substrate surface 1a of semiconductor substrate 1 coated with resist film 105 of which sites for forming movable part 2, fixed parts 3A,3B and support beams 4L,4R are masked to leave the sites. FIG. 5 (A) shows semiconductor substrate 1 viewed from substrate surface 1a similarly to FIG. 4 (A) while FIG. 5 (B) shows a C-C line cross section of FIG. 5 (A).

In FIGS. 5 to 7 of the process for manufacturing a semiconductor, vibrational energy harvester device 10 is provided with several pieces of projections 23,24 of movable part 2 as well as several pieces of projections 32A,32B of fixed parts 3A,3B for the purpose of simple illustration, although it should be provided with more pieces thereof practically.

As shown in FIG. 5 (C) showing a cross section at the same position as FIG. 5 (B), deep etching is performed by ICP (Inductively Coupled Plasma)-RIE (Reactive Ion Etching) to remove parts other than the surface masked with resist film 105 of SOI layer 101 up to embedded oxide film layer 102.

Next, resist film 105 is removed to expose SOI layer 101 as shown in FIG. 5 (D) and (E). FIG. 5 (D) is a B-B line cross section view of FIG. 5 (E) showing semiconductor substrate 1 viewed from substrate surface 1a.

Next, resist film 106 patterned to mask the surface, other than movable part 2 and support beams 4L,4R, shown with hatching in FIG. 6 (A) is formed on bottom side 1b (exposed surface of handle layer 103) opposite to substrate surface 1a of semiconductor substrate 1. Namely, semiconductor substrate 1 is subject to the bottom-side resist patterning process. FIG. 6 (B) is a E-E line cross section view of FIG. 6 (A) showing semiconductor substrate 1 viewed from bottom side 1b.

As shown in FIG. 6 (C) showing a cross section at the same position as FIG. 6 (B), deep etching is performed by ICP-RIE to remove parts other than the surface masked with resist film 106 of handle layer 103 up to embedded oxide film layer 102.

Next, resist film 106 is removed to expose handle layer 103 on bottom side 1b as shown in FIG. 6 (D) and (E). FIG. 6 (D) is a F-F line cross section view of FIG. 6 (E) showing semiconductor substrate 1 viewed from bottom side 1b.

Next, the exposed part of embedded oxide film layer 102 is removed by etching with a buffer solution of hydrofluoric acid so that movable part 2 and support beams 4L,4R are movable as shown in FIG. 7 (A) of cross section at the same position as FIG. 6 (D).

Next, a bubbling oxidation process is performed with KOH (potassium hydroxide) solution to form potassium-containing oxide film 107 as shown in FIG. 7 (B) of cross section at the same position as FIG. 7 (A). Potassium-containing oxide film 107 having a thickness of 1 μm or the like contributes to the electret process for forming an electret film described later. The bubbling oxidation process with KOH solution may be performed according to JP2016-82836-A with FIGS. 2 and 3 and explanation thereof. Details are not explained here.

Next, silicon nitride films 104a,104b,104c,104d are removed by etching as shown in the cross section of FIG. 7 (C) to form the electrodes 25,26,33A,33B at the etched sites.

As described above, components of this example of vibrational energy harvester device are made as shown in FIG. 7 (D) from semiconductor substrate 1. Any one of movable part 2 and fixed parts 3A,3B of vibrational energy harvester device shown in FIG. 7 (D) is subject to electret process to form an electret film. In this example, negatively-electrified electret film is formed on fixed parts 3A,3B. The electret process may be performed according to the Bias-Temperature method disclosed in JP2013-13256-A. Details are not explained here.

Such configured vibrational energy harvester device 10 can output electricity up to Pmax at the maximum shown in Formula 3 of FIG. 12. In Formula 3, symbol m indicates mass of movable part 2 including weight 7, symbol a indicates acceleration, symbol v indicates vibration speed and symbol Q indicates sharpness (so-called Quality factor) at the time of resonance of movable part 2, wherein the Q factor is a ratio of vibration amplitude of movable part 2 per external excitation vibration amplitude. It is apparent from Formula 3 that greater electricity can be output by the first configuration of vibrational energy harvester device 10 in which weight 7 is attached onto movable part 2.

Figure 8:
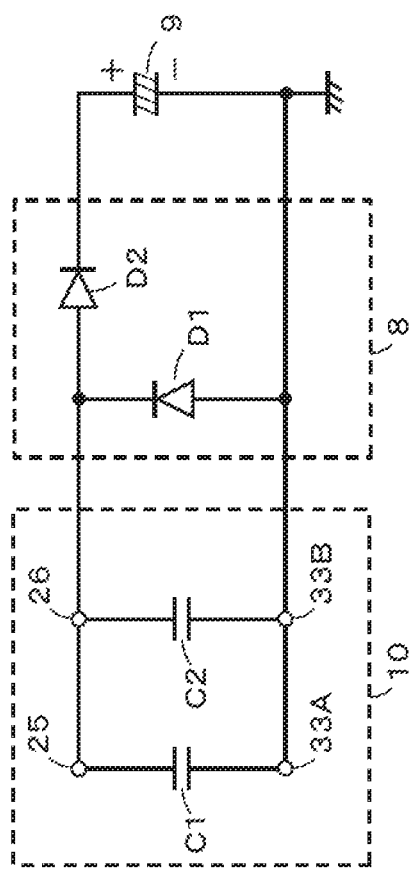
FIG. 8 is a circuit diagram showing an example of charging circuit according to the first configuration of our vibrational energy harvester device.

FIG. 8 shows an example of circuit configuration of charging circuit of vibrational energy harvester device 10. As shown in FIG. 8 of vibrational energy harvester device 10 in this example, capacitances C1,C2 are connected in parallel, the capacitance C1 being generated between electrode 25 of movable part 2 and electrode 33A of fixed part 3A, the capacitance C2 being generated between electrode 26 of movable part 2 and electrode 33B of fixed part 3B. In this example, vibrational energy harvester device 10 has capacitance C, wherein C=C1+C2.

In FIG. 8, electricity output from vibrational energy harvester device 10 having capacitance C is rectified by rectifying circuit 8 consisting of diodes D1,D2 to charge charging capacitor 9 with the rectified output.

Modified Example of First Configuration

In the above described first configuration of vibrational energy harvester device 10, surfaces 21,22 along the vibration direction at both ends of movable part 2 in a direction orthogonal to the vibration direction are provided with projections 23,24 which project like comb teeth, while surfaces 31A,31B opposed to surfaces 21,22 are provided with two fixed parts 3A,3B having surfaces 31A,31B opposed to surfaces 21,22 to form projections 32A,32B which project like comb teeth on surfaces 31A,32B, respectively. In this example, it is possible to form the projections at one end of movable part 2 and fixed part 3A or 3B, instead of forming them at both ends of movable part 2 in the direction orthogonal to the vibration direction.

In this example, it is possible to form electret films on movable part 2 instead of forming the electret film on fixed parts 3A,3B in the first configuration of vibrational energy harvester device 10.

In this example, it is possible to form electret films on at least opposing surfaces 31A,31B of fixed parts 3A,3B instead of forming the electret films on whole fixed parts 3A,3B in the first configuration of vibrational energy harvester device 10.

In this example, it is possible to form electret films on both of movable part 2 and fixed parts 3A,3B to negatively electrify one of them and positively electrify the other, instead of forming the electret film on any one of movable part 2 and fixed parts 3A,3B.

Besides, the semiconductor manufacturing process is not limited to the first configuration of vibrational energy harvester device 10 shown in FIGS. 4 to 7.

Second Configuration

In this example, it is possible that a plurality of pairs of projections oppose each other to form a shape like comb teeth on movable part and fixed part to provide a vibrational energy harvester device having a higher output although only a pair of projections are opposed to each other in the above-described example. Second configuration of vibrational energy harvester device configured as such will be explained.

Figure 9:
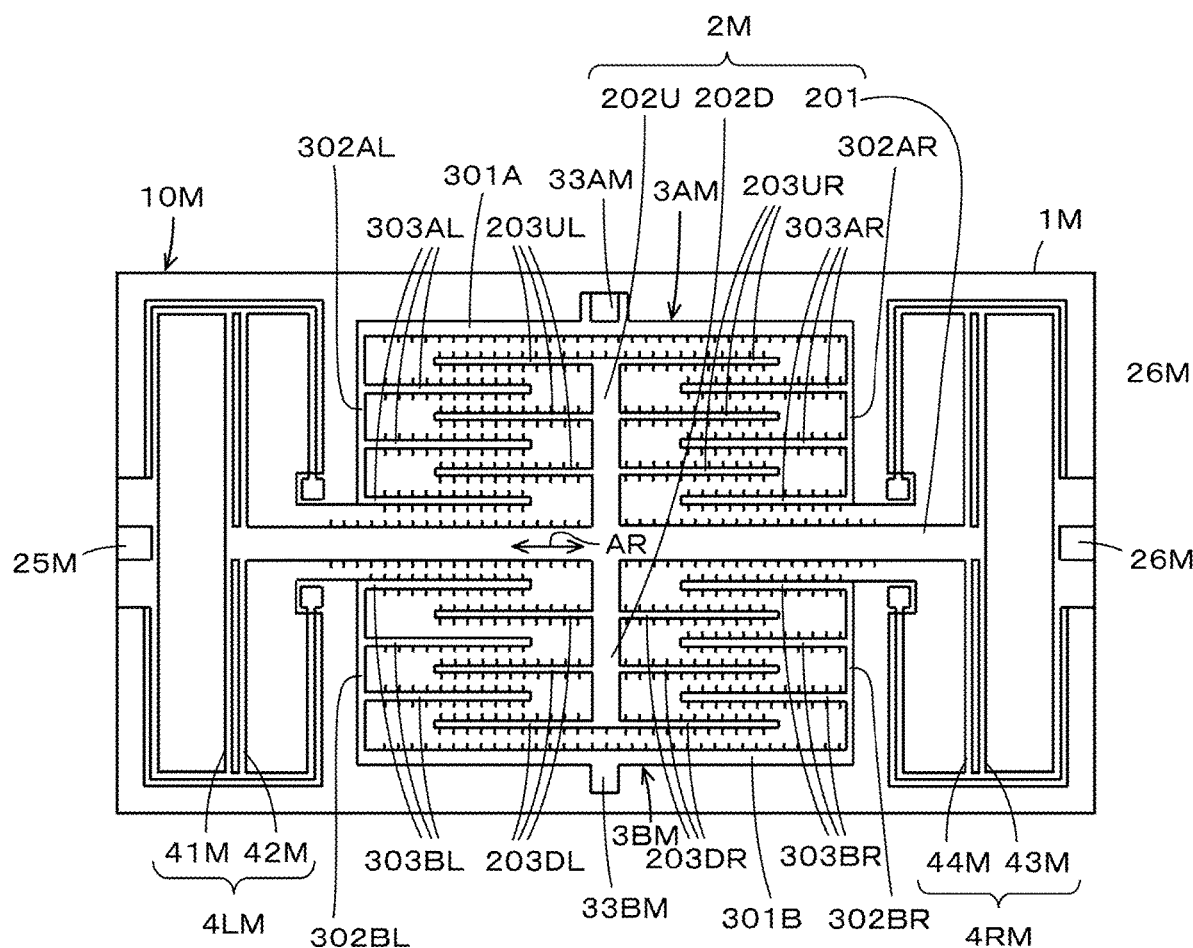
FIG. 9 is an explanation view showing an example of the second configuration of our vibrational energy harvester device.

FIG. 9 shows the second configuration of vibrational energy harvester device 10M viewed from substrate surface of semiconductor substrate 1M along a direction orthogonal to the substrate surface. The second configuration of vibrational energy harvester device 10M is manufactured for semiconductor substrate 1M by the same semiconductor manufacturing process as the first configuration of vibrational energy harvester device 10. Namely, almost the same explanation can be applied, except for the mask pattern with resist film for forming the movable part and fixed parts by etching. Vibrational energy harvester device 10M has 24 mm of length along the vibration direction and 15 mm of length along a direction orthogonal to the vibration direction, for example. In this example, the length along the thickness direction is the same as the first configuration.

In the second configuration shown in FIG. 9, fixed parts 3AM,3BM are opposed to movable part 2M at both sides in a direction orthogonal to the vibration direction of movable part 2M, in the same manner as the first configuration of vibrational energy harvester device 10.

Both ends of movable part 2M in the vibration direction are supported by support beams 4LM,4RM to vibrate in the direction shown in FIG. 9 with arrow AR, in the same manner as movable part 2 of the first configuration of vibrational energy harvester device 10.

Movable part 2M of vibrational energy harvester device 10M in the second configuration comprises: movable main shaft section 201; arms 202U,202D extending along a direction orthogonal to the vibration direction from both sides of movable main shaft section 201 almost at the center in the longitudinal direction; and a plurality of movable branches 203UL,203UR,203DL,203DR extending along the vibration direction shown with arrow AR from both left and right sides of each arm 202U,202D.

In this example, arm 202U projects from main shaft part 201 of movable part 2M toward fixed part 3AM. Further, arm part 202D projects from movable main shaft 201 of movable part 2M toward fixed part 3BM.

As shown in FIG. 9, three pieces of each of movable branch 203UL,203UR extend along the vibration direction of movable part 2M from both left and right sides of arm 202U through each gap in a direction orthogonal to the vibration direction. Further, three pieces of each of movable branch 203DL,203DR extend along the vibration direction of movable part 2M from both left and right sides of arm 202D, as shown in FIG. 9.

On the other hand, fixed part 3AM in the second configuration comprises: fixed main shaft section 301A in parallel to movable main shaft section 201 of movable part 2M; and arms 302AL,302AR extending from both ends in the longitudinal direction toward movable main shaft section 201. Arms 302AL,302AR are provided with fixed branches 303AL,303AR extending along the vibration direction shown with arrow AR from a surface opposing to arm 202U of movable part 2M.

In this example, three pieces of each of fixed branches 303AL,303AR are provided as corresponding to the number of movable branches 203UL,203UR while movable branches 203UL,203UR are engaged to fixed branches 303AL,303AR alternately as shown in FIG. 9.

Fixed part 3BM in the second configuration comprises: fixed main shaft section 301B in parallel to movable main shaft section 201 of movable part 2M; and arms 302BL, 302BR extending from both ends in the longitudinal direction toward movable main shaft section 201. Arms 302BL, 302BR are provided with fixed branches 303BL,303BR extending along the vibration direction shown with arrow AR from a surface opposing to arm 202D of movable part 2M.

In this example, three pieces of each of fixed branches 303BL,303BR are provided as corresponding to the number of movable branches 203DL,203DR while movable branches 203DL,203DR are engaged to fixed branches 303BL,303BR alternately as shown in FIG. 9.

Each number of movable branches and fixed branches may be 1, 2, 3 or more.

Figure 10A:
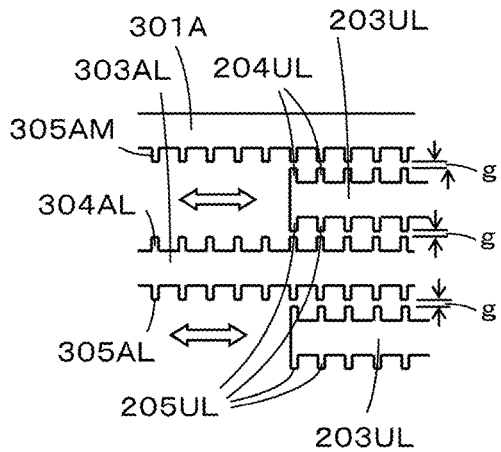
FIGS. 10A and 10B are explanation views showing a main part of the second configuration of our vibrational energy harvester device.
Figure 10B:
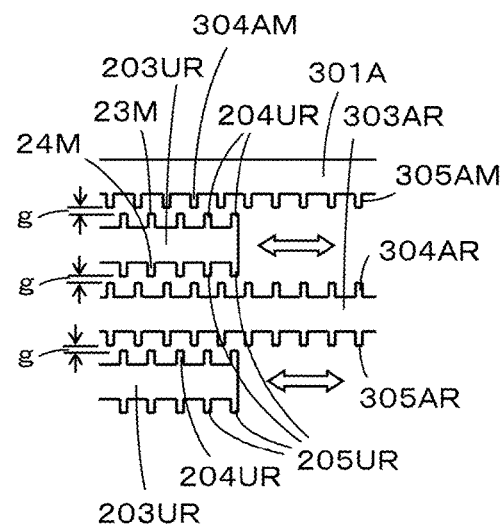

FIG. 10 (A) shows a partial enlarged view showing a condition in which fixed branch 303AL formed on left arm 302AL of fixed part 3AM engages with movable branch 203UL formed on the left side of arm 202U of movable part 2M. FIG. 10 (B) shows a partial enlarged view showing a condition in which fixed branch 303AR formed on right arm 302AR of fixed part 3AM engages with movable branch 203UR formed on the right side of arm 202U of movable part 2M.

As well, fixed branch 303BL formed on left arm 302BL of fixed part 3BM engages with movable branch 203DL formed on the left side of arm 202D of movable part 2M as shown in FIG. 10 (A) while fixed branch 303BR formed on right arm 302BR of fixed part 3BM engages with movable branch 203DR formed on the right side of arm 202D of movable part 2M as shown in FIG. 10 (B). Therefore, the relation between movable branch 203UL and movable branch 203UR and the relation between fixed branch 303AL and fixed branch 303AR will be explained as omitting the explanation of the relation between movable branch 203DL and movable branch 203DR and the relation between fixed branch 303BL and fixed branch 303BR.

As shown in FIG. 10 (A), projections 204UL,205UL are formed on surfaces along the vibration direction of movable branch 203UL opposed to fixed branch 303AL like projections 23,24 of movable part 2 in the first configuration. On the other hand, projections 304UL,305UL corresponding to projection 32A of fixed part 3A in the first configuration are formed on a surface of fixed branch 303AL opposed to movable branch 203UL.

In this example, dimensional relation between projections 204UL,205UL formed on movable branch 203UL of movable part 2M and projections 304AL,305AL formed on fixed branch 303AL is the same as that of the first configuration explained with reference to FIG. 2. Namely, projections 204UL,205UL,304AL,305AL have width Wt of 20 μm, array pitch L of 60 μm and height H of 42.5 μm, as well as gap g between tip surface of projections 204UL,205UL and tip surface of projections 304AL,305AL of 5 μm.

As shown in FIG. 10 (B), projections 304AR,305AR are formed on surfaces along the vibration direction of movable branch 203UR opposed to fixed branch 303AR while projections 304AR,305AR are formed on a surface of fixed branch 303AR opposed to movable branch 203UR. Dimensional relation between projections 204UR,205UR formed on movable branch 203UR of movable part 2M and projections 304AR,305AR formed on fixed branch 303AR is the same as that of the dimensional relation between projections 204UL,205UL formed on movable branch 203UL of movable part 2M and projections 304AL,305AL formed on fixed branch 303AL.

In this example, fixed main shaft section 301 of fixed part 3AM is provided with projections 305AM like projections 304AL,305AL of fixed branch 303AL and projections 304AR,305AR of fixed branch 303AR. Further, movable main shaft section 201 of movable part 2M is provided with projections like projections 204UL,205UL,204UR,205UR of movable branch 203UL,203UR.

As described above, when position x of movable part 2M vibrating is within a range to make the cosine positive in the third term of Formula 2, the spring rate of vibrational energy harvester device 10M is smaller than spring rate k so that movable part 2M can move easily because of soft-spring effect of electrostatic force. On the other hand, when position x of movable part 2M vibrating is within a range to make the cosine negative in the third term of Formula 2, the spring rate of vibrational energy harvester device 10M is greater than spring rate k so that movable part 2M cannot move easily. Namely, this kind of vibrational energy harvester device of electrostatic type might not generate power at a low acceleration because electrostatic force puts a break on movable structures so that it cannot move easily when the restoring force of support beams 4LM,4RM and electrostatic force between movable part 2M and fixed parts 3AM,3BM act in the same direction.

Accordingly, the second configuration can offset electrostatic effects between the left group and the right group, the left group consisting of left movable branch 203UL of arm 202U and left fixed branch 303AL of fixed part 3AM shown in FIG. 10 (A), the right group consisting of right movable branch 203UR of arm 202U and right fixed branch 303AR of fixed part 3AM shown in FIG. 10 (B), wherein an opposing phase of projections 204UL,205UL,304AL, 305AL in the left group is different from another opposing phase of projections 204UR,205UR,304AR,305AR in the right group.

As shown in FIG. 9, difference of the phase between the left and right groups is 90 degrees when array pitch is 1 cycle (360 degrees). Namely, projections 204UR,205UR of movable branch 203UR shift by 90 degrees from projections 304AR,305AR of fixed branch 303AR instead of confronting in the right group shown in FIG. 10 (B) when projections 204UL,205UL of movable branch 203UL confront projections 304AL,305AL of fixed branch 303AL in the left group shown in FIG. 10 (A).

As well, electrostatic effects can be offset between the left group and the right group, the left group consisting of left movable branch 203DL of arm 202D and left fixed branch 303BL of fixed part 3BM, the right group consisting of right movable branch 203DR of arm 202D and right fixed branch 303BR of fixed part 3BM, wherein an opposing phase of projections 204DL,205DL,304BL,305BL in the left group is different from another opposing phase of projections 204DR,205DR,304BR,305BR in the right group.

As described above, in the second configuration of vibrational energy harvester device 10M, the opposing phases between projections of fixed parts 3AM,3BM and projections of movable part 2M belonging to divided two groups are different from each other, so that electrostatic forces acting between movable part 2M and fixed parts 3AM,3BM can have directions opposite to each other in the two groups and therefore the vibration is prevented from being suspended or deteriorated because of electrostatic force putting a brake on movable part 2M.

It is possible that projections of fixed part 3AM,3BM are divided along the vibration direction into two groups instead of dividing projections of movable part 2M in the vibration into two groups as described above.

The second configuration of vibrational energy harvester device 10M also has a weight placed on movable main shaft section 201 of movable part 2M, in the same manner as the first configuration of vibrational energy harvester device 10.

In the second configuration of vibrational energy harvester device 10M, electrodes 25M,26M are formed at both ends of movable part 2M while electrodes 33AM,33BM are formed on fixed parts 3AM,3BM, in the same manner as the first configuration of vibrational energy harvester device 10. Even in the second configuration of vibrational energy harvester device 10M, charging capacitor 9 can be charged with the charging circuit shown in FIG. 8.

In the second configuration, a plurality of capacitances between movable branches 203UL,203UR (including movable main shaft section 201) and fixed branches 303AL, 303AR (including fixed main shaft section 301A) are connected in parallel between electrodes 25M,33AM corresponding to electrode 25,33A shown in FIG. 8. Similarly, a plurality of capacitances between movable branches 203DL,203DR (including movable main shaft section 201) and fixed branches 303BL,303BR (including fixed main shaft section 301B) are connected in parallel between electrodes 26M,33BM corresponding to electrode 26,33B shown in FIG. 8.

Accordingly, the second configuration of vibrational energy harvester device 10M having the same function as that of the first configuration can realize a broadband vibrational energy harvester device capable of increasing the vibrational power generation.

With the second configuration of vibrational energy harvester device 10M, since the opposing phases between projections of fixed parts and projections of a movable part belonging to divided two groups are different from each other, electrostatic forces acting between the movable part and the fixed part are offset so that the vibration is prevented from being suspended or deteriorated because of electrostatic force putting a brake on the movable part.

FIG. 11 shows an experimental result showing a desirable level of charging voltage according to a wide excitation vibration frequency band when resonant frequency is 100 Hz with respect to spring rate k in a condition of free vibration of movable part 2M. FIG. 11 shows the second configuration of vibrational energy harvester device 10M generated 2V of charging voltage at excitation vibration frequency of 50 Hz while generating 3.5V, 4.5V at 70 Hz, 120 Hz, respectively. Namely, it was confirmed that the vibrational energy harvester device can generate a desirable charging voltage within a wide frequency band including 100 Hz of resonant frequency. Besides the excitation vibrational energy was 0.1 G.

Figure 13:
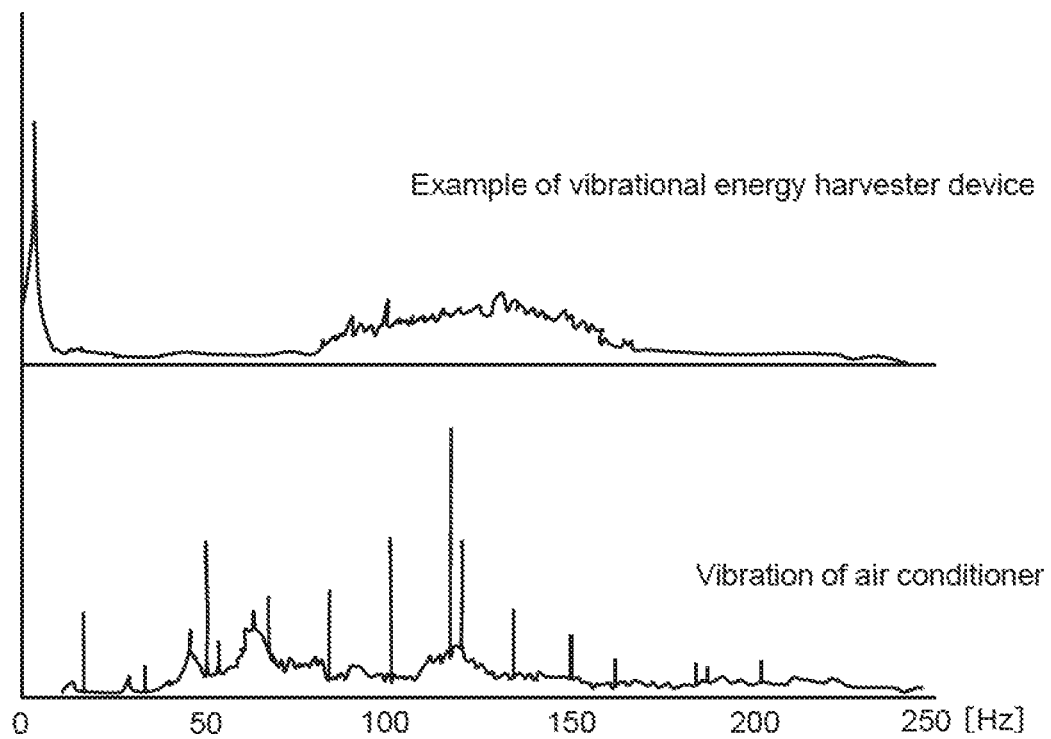
FIG. 13 is another characteristic diagram showing a frequency characteristic of the second configuration of our vibrational energy harvester device.

FIG. 13 shows a spectrum analysis of the second configuration of vibrational energy harvester device 10M in a condition that the vibrational energy harvester device 10M is supplied with external vibrational energy of 0.02 Grms from an air conditioner. In FIG. 13, a spectrum of vibration of air conditioner is shown below while a frequency spectrum of the second configuration of vibrational energy harvester device 10M is shown above. Apparently shown in FIG. 13, the second configuration of vibrational energy harvester device 10M vibrates in a wide frequency band by responding to wide range of vibrational energy.

Modified Example of Second Configuration

The second configuration described above can combine movable part 2M and fixed part 3AM only, by omitting fixed part 3BM.

Further, it is possible to form a plurality of arms extending along a direction orthogonal to the vibration direction from the main shaft section 201 of movable part 2M in different positions in the vibration direction, wherein each arm and a site corresponding to each arm of fixed parts 3AM,3BM are configured as described above to make a structure comprising more pairs of movable parts and fixed parts.

Furthermore, it is possible that groups having different opposing phases of projection are positioned along a direction orthogonal to the vibration direction although the second configuration is provided with groups having different opposing phases of projection positioned along the vibration direction of movable part. Namely, the group having different opposing phases of projection may consist of the groups between movable part 2M and fixed parts 3AM,3BM. Of course such a configuration can be applied to the first configuration.

Further, the difference of opposing phases of projections may not be 90 degrees as described above, to the extent of contributing to the offset between electrostatic forces of the movable part and the fixed part.

Other Configuration or Modified Example

Our vibrational energy harvester device is not limited to a MEMS device although the above-described configuration of vibrational energy harvester device is a MEMS device formed by performing a semiconductor process.

The shapes of projections are not limited specifically although the projections have a rectangular cross section of the movable part and fixed parts in the above-described configuration.

It is possible to provide the movable part and the fixed part above and below a gap when viewed along the gravitational direction, although the fixed parts are provided at the sides of left and right from the movable part in the above-described configuration. The movable part may vibrate in a rotary direction instead of linear direction.

EXPLANATION OF SYMBOLS 1, 1M: semiconductor substrate
2, 2M: movable part
3A, 3B, 3AM, 3BM: fixed part
4L, 4R, 4LM, 4RM: support beam
7: weight
23, 24: projection of movable part 2
32A, 32B: projection of fixed parts 3A,3B

The invention claimed is:

1. A vibrational energy harvester device capable of vibrating in a vibration direction by an externally supplied vibrational energy, comprising:
a movable part having a first surface along the vibration direction; and
a fixed part which has a second surface opposed through a gap to the first surface and is positionally fixed to allow the movable part to vibrate in the vibration direction,
wherein
an electret film is formed on at least one of the fixed part and the movable part,
the first surface of the movable part and the second surface of the fixed part are provided with a plurality of projections which project in a direction orthogonal to the vibration direction and are disposed to form a shape like comb teeth in the vibration direction,
the electret film having an electret electric potential is formed on at least one of the first surface of the movable part and the second surface of the fixed part,
the movable part has a spring rate which is modulated according to a function of a positional parameter in the vibration direction through an electrostatic force acting between the movable part and the fixed part, and
the electret electric potential, an array pitch of the projections of the fixed part and the projections of the movable part, a difference between a maximum value and a minimum value of a capacitance between the fixed part and the movable part vibrationally shifting, are selected to reduce the spring rate of the movable part from an initial value of the spring rate corresponding to a free vibration of the movable part.

2. The vibrational energy harvester device according to claim 1, wherein the fixed part and the movable part are MEMS (Micro Electro Mechanical System) devices formed from a semiconductor substrate.

3. The vibrational energy harvester device according to claim 2, wherein the first surface of the movable part and the second surface of the fixed part are orthogonal to a substrate surface of the semiconductor substrate, both ends of the movable part in the vibration direction being supported by support beams formed from the semiconductor substrate to allow the movable part to vibrationally shift in the vibration direction.

4. The vibrational energy harvester device according to claim 1, wherein the movable part has a plurality of the first surfaces along the vibration direction while the fixed part has a plurality of the second surfaces opposed to the first surfaces of the movable part.

5. The vibrational energy harvester device according to claim 1, wherein the movable part is provided with a weight to apply a gravity in a direction crossing the vibration direction.

6. The vibrational energy harvester device according to claim 1, further comprising:
a plurality of the movable parts in a direction orthogonal to the vibration direction,
wherein the fixed part has a plurality of the second surfaces opposed to the first surfaces of the movable part.

* * * * *